US010348956B2

(12) United States Patent
Wang et al.

(10) Patent No.: US 10,348,956 B2
(45) Date of Patent: *Jul. 9, 2019

(54) INTEGRATED SENSOR AND LENS ASSEMBLY WITH DIFFERENTIAL THREADS ADJUSTMENT

(71) Applicant: GoPro, Inc., San Mateo, CA (US)

(72) Inventors: Steven Xiwen Wang, Fremont, CA (US); Karen Ann Baumgartner, San Mateo, CA (US); Emilio Graff, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/144,293

(22) Filed: Sep. 27, 2018

(65) Prior Publication Data
US 2019/0037129 A1   Jan. 31, 2019

Related U.S. Application Data

(63) Continuation of application No. 14/938,725, filed on Nov. 11, 2015, now Pat. No. 10,116,853.

(51) Int. Cl.
*H04N 5/232* (2006.01)
*H04N 5/225* (2006.01)
*G02B 7/02* (2006.01)

(52) U.S. Cl.
CPC .......... *H04N 5/23212* (2013.01); *G02B 7/02* (2013.01); *H04N 5/2254* (2013.01); *H04N 5/2257* (2013.01)

(58) Field of Classification Search
None
See application file for complete search history.

(56) References Cited

U.S. PATENT DOCUMENTS

| | | | | | |
|---|---|---|---|---|---|
| 6,023,061 | A | * | 2/2000 | Bodkin | B64D 47/08 250/252.1 |
| 10,116,853 | B2 | * | 10/2018 | Wang | H04N 5/23212 |
| 2002/0017788 | A1 | * | 2/2002 | Krug | E21B 17/042 285/333 |
| 2004/0012861 | A1 | | 1/2004 | Yamaguchi | |
| 2008/0309814 | A1 | * | 12/2008 | Kinoshita | G02B 13/001 348/340 |
| 2010/0158510 | A1 | * | 6/2010 | Jannard | G03B 17/14 396/533 |
| 2015/0002702 | A1 | * | 1/2015 | Hu | G02B 7/102 348/240.3 |

* cited by examiner

*Primary Examiner* — Clayton E. LaBalle
*Assistant Examiner* — Dennis Hancock
(74) *Attorney, Agent, or Firm* — Young Basile Hanlon & MacFarlane, P.C.

(57) ABSTRACT

An integrated image sensor and lens assembly comprises an image sensor substrate comprising an image sensor, a lens mount coupled to the image sensor substrate, a tube adapter extending into a channel of the lens mount, and a lens barrel housing a set of lenses for directing light to the image sensor. The lens barrel has a threaded portion that extends into the tube adapter. An upper subsection of the lens mount and a lower subsection of the lens barrel are unthreaded.

20 Claims, 6 Drawing Sheets

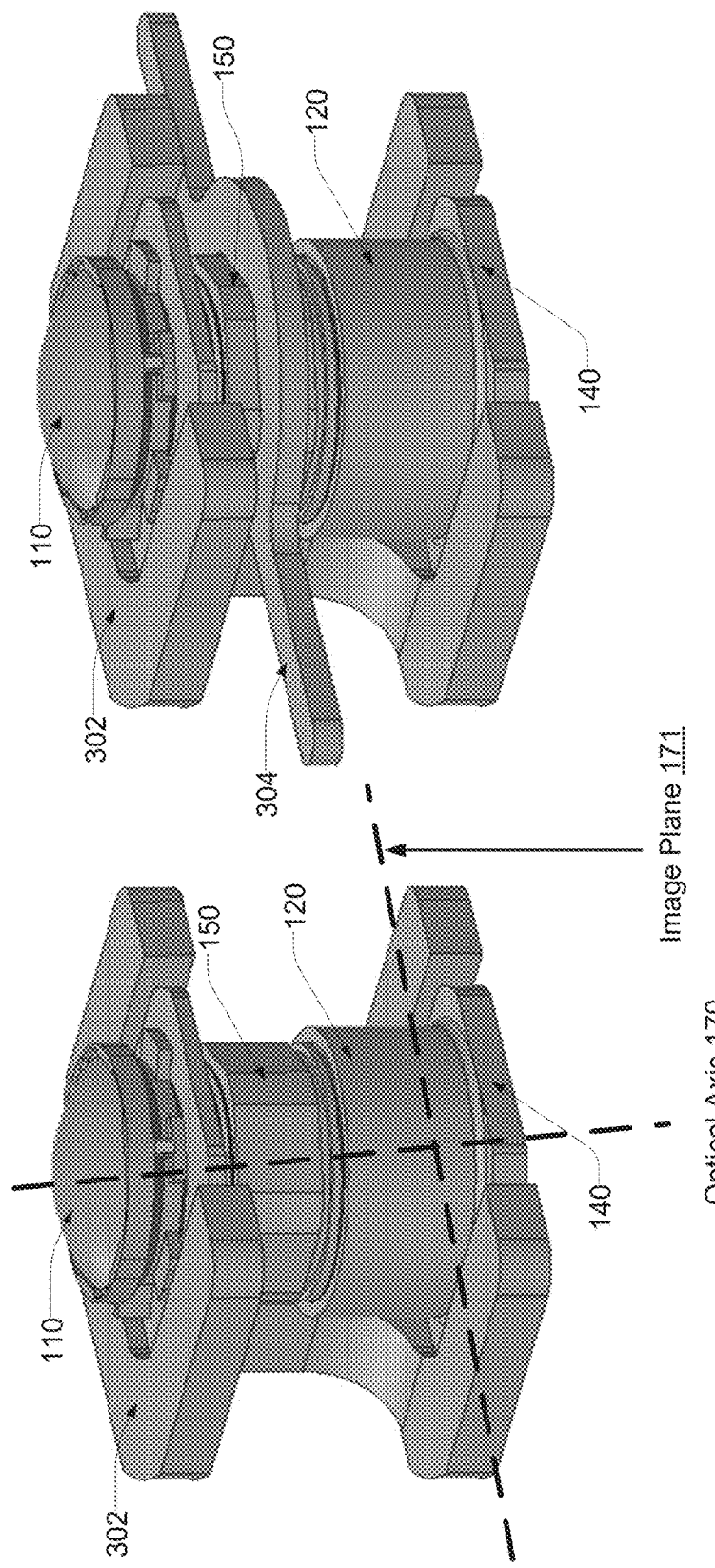

INTEGRATED SENSOR AND LENS ASSEMBLY WITH DIFFERENTIAL THREADS ADJUSTMENT

CROSS REFERENCE TO RELATED APPLICATIONS

This application is a continuation of U.S. patent application Ser. No. 14/938,725, filed on Nov. 11, 2015, which is incorporated by reference in its entirety.

BRIEF DESCRIPTION OF THE DRAWINGS

FIG. 3A illustrates an embodiment of a stand and wrench for adjusting the focal length of an integrated image sensor and lens assembly.

FIG. 3B illustrates an embodiment of a stand and wrench for adjusting the focal length of an integrated image sensor and lens assembly.

BACKGROUND

Figure 1:
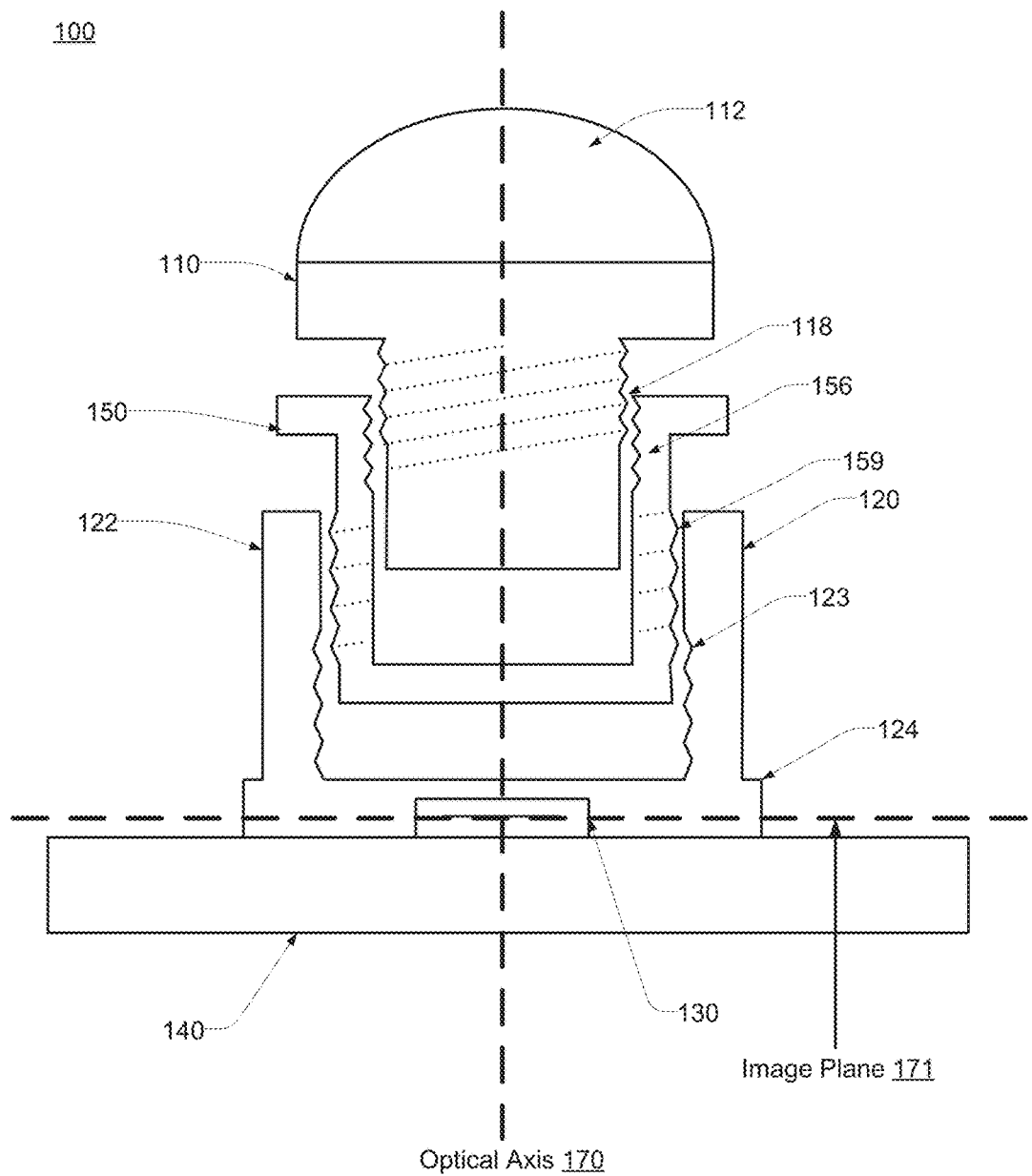
FIG. 1 illustrates a cross-sectional view of an embodiment of an integrated image sensor and lens assembly.

Manufacturing of lens assemblies for high-resolution cameras typically require a high degree of precision in positioning components of the lens assembly to ensure that the lens will achieve proper focus. As a result, a challenge exists in achieving a fast, automated, and high-yielding assembly process for high-resolution cameras.

In a conventional manufacturing process, a lens barrel housing the camera lens is placed within a housing assembly affixed to an image sensor. The position of the lens barrel is adjusted relative to the image sensor such that the focal plane of the lens aligns with the image plane of the image sensor. Upon tuning the lens barrel's position and alignment for optical focal length and axial tilt, dimensional shifts of the lens barrel may be introduced such as by post curing and cycling tests or by thermal changes following alignment. The lens may shift along the optical axis and the optical axis may tilt as a result of the lens barrel shifting, which alters the distance between the lens and the image sensor. This affects focus of the lenses and compromises performance and yield.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

An integrated image sensor and lens assembly comprises a lens barrel, an adapter tube, and a lens mount. The lens barrel is coupled to the adapter tube which is coupled to the lens mount. The lens barrel houses a set of lenses for directing light to the image sensor. The lens mount is affixed to the image sensor substrate. The lens mount includes a tube portion and a base portion. The tube portion has a channel and extends from the base portion in a direction of an optical axis substantially perpendicular to a focal plane. The tube adapter includes a body extending into a channel of the tube portion of the lens mount, and the lens barrel includes a threaded portion extending into the body of the tube adapter. In some embodiments, the lens mount includes a first thread having a first pitch forming a spiral on an inner surface of the tube portion. The tube adapter comprises a second thread on an exterior surface of the tube adapter. The second thread is reciprocal to the first thread and has the first pitch. The first and second threads secure the tube adapter within the lens mount. The tube adapter further comprises a third thread having a second pitch different than the first pitch. The third thread forms a spiral on an interior surface of the tube adapter. The lens barrel comprises a fourth thread on an exterior surface of the lens barrel reciprocal to the third thread and has the second pitch. The third and fourth threads secure the lens barrel within the tube adapter. A rotation of the tube adapter with respect to the lens barrel and the lens mount causes linear movement of the lens barrel and the lens mount with respect to the tube adapter in a same direction along the optical axis.

A magnitude of a difference between the first pitch and the second pitch is smaller than the first pitch and the second pitch. A single rotation of the of the tube adapter with respect to the lens barrel and the lens mount causes a change in focal length less than the first pitch and less than the second pitch.

FIG. 1 illustrates a cross-sectional view of an embodiment of an integrated image sensor and lens assembly 100 that includes a camera lens barrel 110, a camera lens mount 120, an adapter tube 150, and an image sensor substrate 140. The example illustrated in FIG. 1 is an exploded view with parts separated for clarity of description. One of ordinary skill in the art would appreciate that the parts, as illustrated, may not be to scale relative to each other. The image sensor substrate 140 has an image sensor assembly 130 (e.g., a high-definition image sensor) for capturing images and/or videos. The image sensor substrate 140 comprises a printed circuit board for mounting the image sensor assembly 130 and may furthermore include various electronic components that operate with the image sensor assembly 130 or provide external connections to other components of the camera system. The image sensor assembly 130 houses an image sensor (e.g., a high-definition image sensor) for capturing images and/or video and includes structural elements for physically coupling the image sensor assembly 130 to the image sensor substrate 140 and to the camera lens mount 120. The image sensor of the image sensor assembly 130 lies on an image plane 171 for optimal focus.

The camera lens mount 120 is physically affixed to the image sensor substrate 140 and secured to the adapter tube 150 via a first threaded securing mechanism. The adapter tube 150 is further secured to the camera lens barrel 110 via a second threaded securing mechanism. The lens barrel 110 includes a lens window 112 includes optical components to enable external light to enter the lens barrel 110 and be directed to the image sensor assembly 130. In an embodiment, the bottom of the adapter tube 150 is ring shaped and has an opening that allows rays of lights to pass through to the image sensor assembly 130.

The lens barrel 110 comprises one or more lenses (e.g., a compound lens) or other optical components to direct light to the image sensor assembly 130. The lens barrel 110 comprises a threaded or at least partially threaded portion that is substantially cylindrical and structured to at least partially extend into a substantially cylindrical opening of the adapter tube 150 and mate with a reciprocally threaded interior portion of the adapter tube 150. For example, in one embodiment, the lens barrel 110 includes threads 118 that form a spiral extending from the outer surface of the threaded portion of the lens barrel 110. In FIG. 1, the threads 118 are illustrated with dotted lines to indicate that they are on the outer surface of the lens barrel 110 and do not form part of the cross-sectional view. The adapter tube 150 includes threads 156 that form a spiral indentation on its inner surface. The threads 118, 156 of the lens barrel 110 and of the adapter tube 150 respectively are configured to mate with each other such that the lens barrel 110 may be fastened to the adapter tube 150 in a tunable arrangement with respect to each other to enable the vertical position of the lens barrel 110 within the adapter tube 150 to be vertically adjusted. For example, the lens barrel 110 can be rotated in a first direction to lower the lens barrel 110 with respect to a bottom edge of the adapter tube 150 and can be rotated in a second direction to raise the lens barrel 110 with respect to the bottom edge of the adapter tube 150. In an alternative embodiment, the threads 118 on the lens barrel 110 may be formed as an indentation on the outer surface of the threaded portion of the lens barrel 110 and the threads 156 may be formed extended from the inner surface of the adapter tube 150.

In the illustrated example, the threads 118 are on the upper subsection of the cylindrical portion of the lens barrel 110 and the threads 156 are on the upper subsection of the adapter tube 150. In other embodiments, the threads 118 may be throughout the entire cylindrical portion or a different portion 116 of the lens barrel 110 and the threads 156 may be throughout the entire inner surface or a different portion of the adapter tube 150.

The adapter tube 150 furthermore includes threads 159 forming a spiral extending from its outer surface. The threads 159 are illustrated with dotted lines to indicate that they are on the outer surface of the adapter tube 150 and not part of the cross-sectional view. The threads 159 are configured to mate with reciprocal threads 123 formed by an indentation on an inner surface of a tube portion 122 of the lens mount 120 so that the vertical positions of the adapter tube 150 and lens mount 120 are tunable with respect to each other. For example, the adapter tube 150 can be rotated in a first direction to lower the adapter tube 150 with respect to a base portion 124 of the lens mount 120 and can be rotated in a second direction to raise the adapter tube 150 with respect to the base portion 124 of the lens mount 120. In an alternative embodiment, the threads 159 of the adapter tube 150 may be formed as an indentation on the outer surface of the adapter tube 150 and the threads 123 may be formed extended from the inner surface of the tube portion 122 of the lens mount 120.

In the illustrated example, the threads 159 are on the lower subsection of the adapter tube 150 and the threads 123 are on the lower subsection of the tube portion 122 of the lens mount 120. In other embodiments, the threads 159 may be throughout the entire outer surface or a different portion of the adapter tube 150 and the threads 123 may be throughout the entire tube portion 122 or a different portion of the lens mount 120. In a further embodiment, the threads 159 are on the upper subsection of the tube adapter 150 and the threads 123 are on the upper subsection of the tube portion 122 of the lens mount 120.

The base portion 124 of the lens mount includes a bottom surface in a plane substantially parallel to a surface of the image sensor substrate 140. In one embodiment, the base portion 124 may include a recess (not viewable in FIG. 1) to enable the bottom surface of the base portion 124 to lie flat against the image sensor substrate 140 while partially enclosing the image sensor assembly 130. The tube portion 122 of the lens mount 120 extends away from the image sensor assembly 130 along the optical axis 170 and includes a substantially cylindrical channel for receiving the lens adapter 150.

The first set of threads 118, 156 securing the lens barrel 110 to the adapter tube 150 and the second set of threads 159, 123 securing the adapter tube 150 to the camera lens mount 120 are configured to cause the lens barrel 110 and the lens mount 120 to move in the same direction along the optical axis 170 in response to a rotation of the adapter tube 150 with respect to both the lens barrel 110 and the lens mount 120. Thus, for example, a rotation of the adapter tube 150 about the optical axis 170 in a first direction with respect to the lens mount 120 and the lens barrel 110 (which may be prevented from rotating with respect to each other) causes the lens barrel 110 to be pushed away from the adapter tube 150 and causes the lens mount 120 to be pulled towards the adapter tube 150. Similarly, a rotation of the adapter tube 150 about the optical axis 170 in a second direction with respect to the lens mount 120 and the lens barrel 110 (which may be prevented from rotating with respect to each other) causes the lens barrel 110 to be pulled toward the adapter tube 150 and causes the lens mount 120 to be pushed away from the adapter tube 150. The overall change in focal length is determined by the difference between the distance the lens barrel 110 moves with respect to the adapter tube 150 and the distance the lens mount 120 moves with respect to the adapter tube 150. These distances are in turn dictated by the respective pitches of the first set of threads 118, 156 securing the lens barrel 110 to the adapter tube 150 and the second set of threads 159, 123 securing the adapter tube 150 to the camera lens mount 120

Using the differential threading mechanism described above, very fine adjustments can be made to the focal length that is not limited by the pitch of the threads 118, 156, or the threads 123, 159. This beneficially enables the integrated sensor and lens assembly 100 to achieve similar or better levels of precision with coarser threads than assemblies having non-differential threading. Such coarser threading is desirable because very fine pitched threads can be very weak and easy to damage, especially for plastic material parts.

For example, in one embodiment, the threads 118 of the lens barrel 110 and the threads 156 of the tube adapter 150 have a first pitch of 0.53 mm such that the position of the lens barrel 110 along the optical axis 170 can be adjusted relative to the tube adapter 150 at a rate +/−0.53 mm per turn of the adapter tube 150 relative to the lens barrel 110. The threads 159 on the outer surface of the adapter tube 150 and the threads 123 on the inner surface of the tube portion 122 of the lens mount 120 have a second pitch of 0.50 mm such that the position of the lens mount 120 along the optical axis can be adjusted relative to the tube adapter 150 at a rate of +/−0.50 mm per turn of the adapter tube 150 relative to the lens barrel 110. The difference between the first pitch of the threads 118, 156 and the second pitch of the threads 159, 123 is 0.03 mm so that the position of the lens barrel 110 relative to the lens mount 120 can be adjusted at a rate of 0.03 mm per turn of the adapter tube 150 relative to the lens barrel 110 and lens mount 120. This very fine adjustment can be achieved with pitches much coarser than that which would be traditionally used in a non-differential threading system, and therefore enable the use of threads that are substantially more durable than would be otherwise be used. In various embodiments, as tuning may result in particle generation, a viscous non-curing fluid can be applied to the threads 118, 156, 159, and 123 in order to provide sealing and particle retention. In the case where a fluid is used, the lower portion 116 of the lens barrel 110 may be tapered and the body 158 of the adapter tube 150 may be configured to include an interior lip (not shown) to retain the fluid and preclude it from being deposited onto the sensor 140.

Figure 2B:
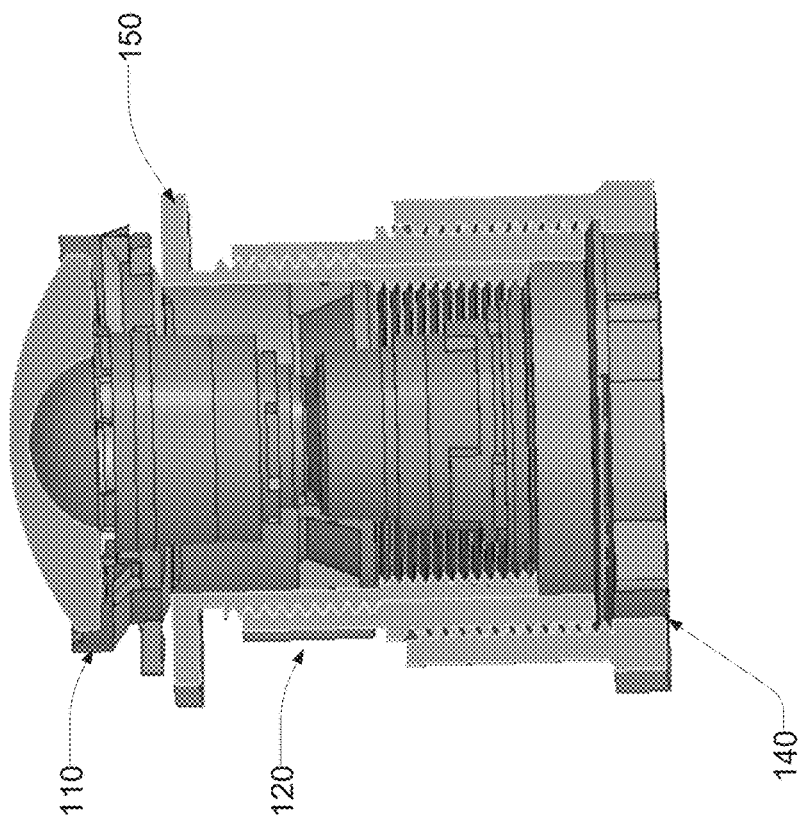
FIG. 2B illustrates a cross-sectional view of an embodiment of a lens barrel, an adapter tube, a lens mount, and an image sensor substrate, as assembled.
Figure 2A:
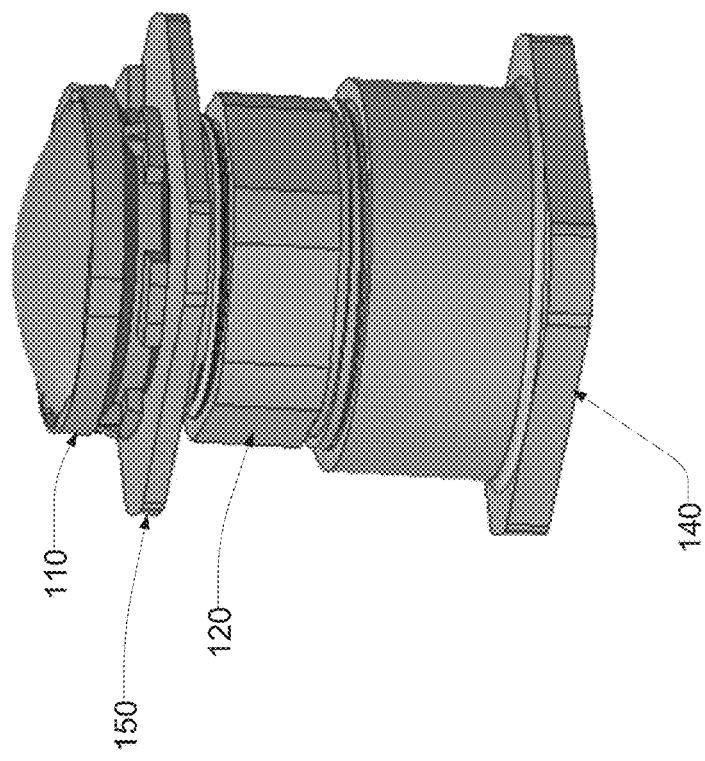
FIG. 2A illustrates a perspective view of an embodiment of a lens barrel, an adapter tube, a lens mount, and an image sensor substrate, as assembled.

FIGS. 2A and 2B illustrate, respectively, a perspective view of and a cross-sectional view of a lens barrel 110, an adapter tube 150, a lens mount 120, and an image sensor substrate 140, as assembled.

FIGS. 3A and 3B illustrate a first embodiment of a stand 302 and wrench 304 for adjusting the focal length of an integrated image sensor and lens assembly 100 described above. The stand 302 supports the integrated image sensor and lens assembly 100 and prevents the lens barrel 110 and the lens mount 120 from rotating about the optical axis 170 while allowing rotation of the tube adapter 150 about the optical axis 170 and allowing axial movement of the lens barrel 110 and lens mount 120 along the optical axis 170 relative to the tube adapter 150. As illustrated in FIG. 3B, the wrench 504 is structured to secure around the tube adapter 150 and includes torque arms to enable rotation of the tube adapter 150 relative to the lens barrel 110 and the lens mount 120, thereby adjusting the focal plane of the assembly 100. In addition to the wrench 304 as illustrated, stepper motors or other similar tools may be used to rotate the tube adapter 150 relative to the lens barrel 110 and the lens mount 120.

Figure 4A:
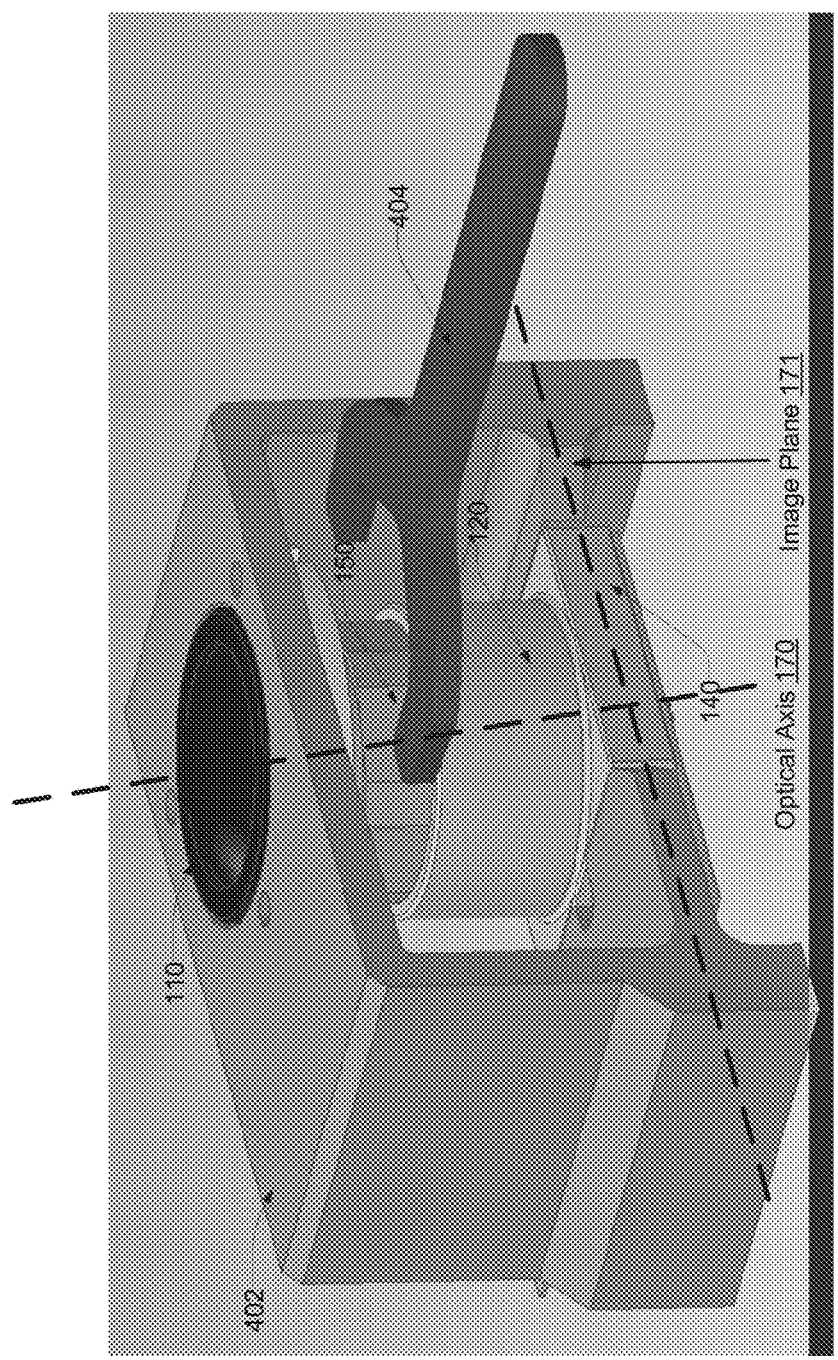
FIG. 4A illustrates a perspective view of an embodiment of a stand and wrench for adjusting the focal length of an integrated image sensor and lens assembly.
Figure 4B:
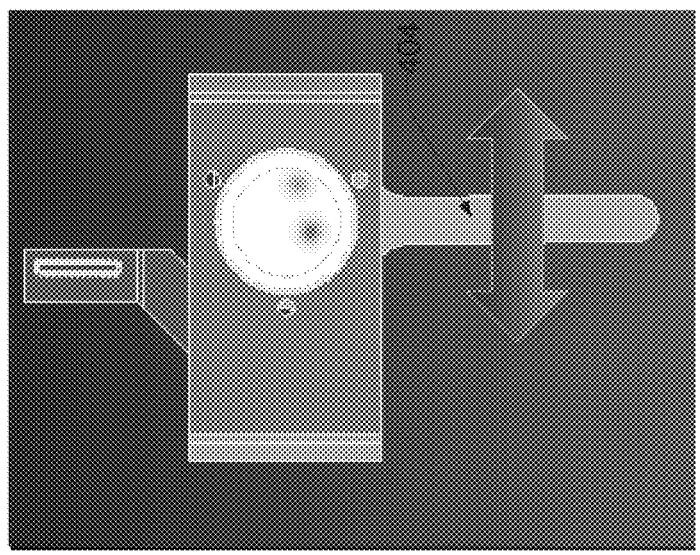
FIG. 4B illustrates a top view of an embodiment of a stand and wrench for adjusting the focal length of an integrated image sensor and lens assembly.

FIGS. 4A and 4B illustrate a second embodiment of a stand 402 and wrench 404 for adjusting the focal length of an integrated image sensor and lens assembly 100 described above including a perspective view and top view respectively. The stand 402 and wrench 404 of FIG. 4A operate similarly to the stand 502 and wrench 504 of FIGS. 5A-B but include some structural variations.

Example Camera System Configuration

Figure 5:
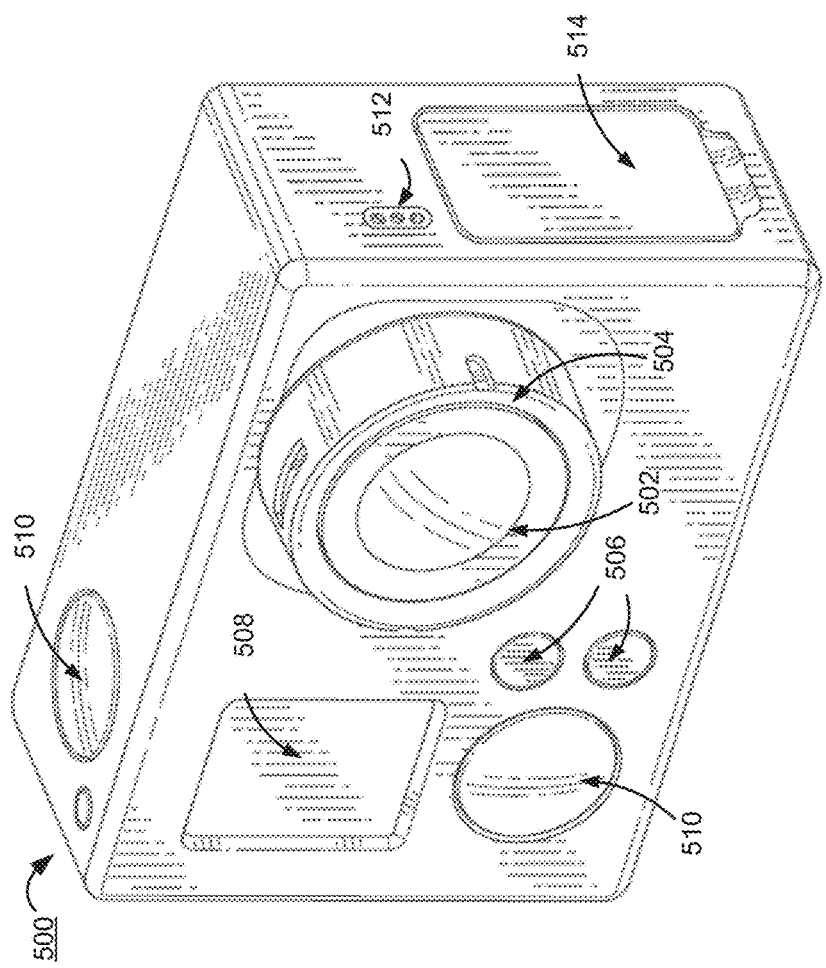
FIG. 5 illustrates an embodiment of an example camera that includes the integrated image sensor and lens assembly.

FIG. 5 illustrates an embodiment of an example camera 500 that includes the integrated image sensor and lens assembly 100 described above. The camera 500 comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera 500 is configured to capture images and video, and to store captured images and video for subsequent display or playback. As illustrated, the camera 500 includes a lens 502 configured to receive light incident upon the lens and to direct received light onto an image sensor internal to the lens. The lens 502 is enclosed by a lens ring 504, which are both part of the integrated image sensor and lens assembly 100 discussed above.

The camera 500 can include various indicators, including the LED lights 506 and the LED display 508. The camera 500 can also include buttons 510 configured to allow a user of the camera to interact with the camera, to turn the camera on, and to otherwise configure the operating mode of the camera. The camera 500 can also include a microphone 512 configured to receive and record audio signals in conjunction with recording video. The side of the camera 500 includes an I/O interface 514.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

The invention claimed is:

1. An integrated image sensor and lens assembly comprising:
    an image sensor substrate comprising an image sensor;
    a lens mount coupled to the image sensor substrate, the lens mount including a first thread;

a tube adapter extending into a channel of the lens mount, the tube adapter including a second thread and a third thread; and a lens barrel housing a set of lenses for directing light to the image sensor, the lens barrel having a threaded portion extending into the tube adapter, the threaded portion including a fourth thread reciprocal to the third thread, wherein an upper subsection of the lens mount and a lower subsection of the lens barrel are unthreaded.

2. The integrated image sensor and lens assembly of claim 1, wherein the lens mount includes a tube portion and a base portion.

3. The integrated image sensor and lens assembly of claim 2, wherein the tube portion includes a channel and extends from the base portion in a direction of an optical axis substantially perpendicular to a focal plane.

4. The integrated image sensor and lens assembly of claim 3, wherein the lens barrel is configured to rotate about the optical axis.

5. The integrated image sensor and lens assembly of claim 4, wherein rotation of the tube adapter with respect to the lens barrel and the lens mount causes linear movement of the lens barrel and the lens mount with respect to the tube adapter in a same direction along the optical axis.

6. The integrated image sensor and lens assembly of claim 2, wherein the lens mount includes the first thread having a first pitch forming a first spiral on an inner surface of the tube portion.

7. The integrated image sensor and lens assembly of claim 6, wherein the tube adapter includes the second thread on an exterior surface of the tube adapter, the second thread reciprocal to the first thread and having the first pitch.

8. The integrated image sensor and lens assembly of claim 7, wherein the first thread and the second thread secure the tube adapter within the lens mount.

9. The integrated image sensor and lens assembly of claim 7, wherein the tube adapter further includes the third thread having a second pitch different than the first pitch, the third thread forming a second spiral on an inner surface of the tube adapter.

10. The integrated image sensor and lens assembly of claim 9, wherein the threaded portion includes the fourth thread on an exterior surface of the lens barrel reciprocal to the third thread and having the second pitch.

11. The integrated image sensor and lens assembly of claim 10, wherein the third thread and the fourth thread secure the lens barrel within the tube adapter.

12. The integrated image sensor and lens assembly of claim 9, wherein a magnitude of a difference between the first pitch and the second pitch is smaller than the first pitch and the second pitch.

13. The integrated image sensor and lens assembly of claim 9, wherein a single rotation of the tube adapter with respect to the lens barrel and the lens mount causes a chance in focal length less than the first pitch and less than the second pitch.

14. The integrated image sensor and lens assembly of claim 7, wherein the first thread is on a lower subsection of the lens mount, the second thread is on a lower subsection of the tube adapter, the third thread is on an upper subsection of the tube adapter, and the fourth thread is on an upper subsection of the lens barrel.

15. The integrated image sensor and lens assembly of claim 1, wherein the threaded portion of the lens barrel is tapered.

16. The integrated image sensor and lens assembly of claim 1, wherein the tube adapter is configured to retain and prevent a fluid from being deposited onto the image sensor.

17. The integrated image sensor and lens assembly of claim 16, wherein the fluid is viscous non-curing fluid.

18. An imaging device, comprising:
one or more controls to operate the imaging device;
a storage medium to store images captured by the imaging device;
an image sensor substrate comprising an image sensor;
a lens mount coupled to the image sensor substrate, the lens mount including a first thread;
a tube adapter extending into a channel of the lens mount, the tube adapter including a second thread and a third thread; and
a lens barrel housing a set of lenses for directing light to the image sensor, the lens barrel having a threaded portion extending into the tube adapter, the threaded portion including a fourth thread reciprocal to the third thread,
wherein an upper subsection of the lens mount and a lower subsection of the lens barrel are unthreaded.

19. The imaging device of claim 18, wherein the lens mount includes a tube portion and a base portion, the tube portion including a channel and extending from the base portion in a direction of an optical axis substantially perpendicular to a focal plane.

20. The imaging device of claim 19, wherein the lens barrel is configured to rotate about the optical axis.

* * * * *